United States Patent Office 3,412,125
Patented Nov. 19, 1968

3,412,125
COORDINATION COMPLEXES OF NORMAL HALIDE SALTS OF ANTIMONY, TIN AND TITANIUM AND HYDROXYALKYL POLYPHOSPHATES
Frank J. Welch, Charleston, and Herbert J. Paxton, Jr., Elkview, W. Va., assignors to Union Carbide Corporation, a corporation of New York
No Drawing. Filed Oct. 30, 1963, Ser. No. 320,006
9 Claims. (Cl. 260—446)

This invention relates to coordination complexes of halides of antimony, tin and titanium with hydroxyalkyl polyphosphates, and to the use of these complexes as fire retardants for polymer systems.

Compounds of antimony, tin and titanium, as well as compounds of phosphorus, are valuable flame retardants for various polymer systems. However, the usefulness of these antimony, tin and titanium compounds is somewhat limited by their insolubility in organic media, as this makes them difficult to incorporate into polymer systems, lowers their effectiveness, and precludes their use in transparent resins.

In accordance with the instant invention, a method has been found for solubilizing antimony, tin and titanium halides and rendering them compatible with various polymer systems. Thus it has been found that these compounds can be complexed with various hydroxyalkyl polyphosphates which are themselves effective fire retardants, to produce coordination complexes which are highly soluble in and compatible with a wide variety of organic liquids and polymers.

While any halide of antimony, tin, or titanium can be employed in the instant invention, the chlorides and bromides are preferred because of their greater solubility. Included among the halides which can be employed are antimony tribromide, antimony trichloride, antimony pentachloride, antimony trifluoride, antimony pentafluoride, antimony triiodide, antimony pentaiodide, stannous bromide, stannic bromide, stannic tribromide chloride, stannic dibromide dichloride, stannic bromide trichloride, stannic dibromide diiodide, stannous chloride, stannic chloride, stannic dichloride diiodide, stannous fluoride, stannic fluoride, stannous iodide, stannic iodide, titanium dibromide, titanium tetrabromide, titanium dichloride, titanium trichloride, titanium tetrachloride, titanium trifluoride, titanium tetrafluoride, titanium diiodide, titanium tetraiodide, and the like.

The hydroxyalkyl polyphosphates which are employed in the instant invention can be represented by the formula $$\begin{array}{c}Z\\ \diagdown\\ Z\diagup\end{array}\overset{O}{\underset{\parallel}{P}}-(OR)_y-O-\overset{O}{\underset{\parallel}{P}}\begin{array}{c}Z\\ \diagup\\ \diagdown Z\end{array}$$

wherein R is a divalent residue of a vicinal epoxide, y is an integer having a value of at least 1, for example up to 50 or more, and each Z is individually $$HO-(RO)_y-\quad \text{or} \quad \begin{array}{c}Z\\ \diagdown\\ Z\diagup\end{array}\overset{O}{\underset{\parallel}{P}}-(OR)_y-O-$$

wherein R, y and Z are as above defined. Preferably R is a divalent residue represented by the formula

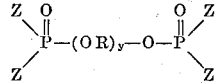

wherein $R^1$, $R^2$, $R^3$, and $R^4$ are individually hydrogen, alkyl, alkenyl, haloalkyl, haloalkenyl, aryloxyalkyl, and like groups, or wherein taken together two of $R^1$, $R^2$, $R^3$, and $R^4$ are a cycloalkyl group, preferably having from 1 to 10 carbon atoms. Most preferably, however, R is the divalent residue of ethylene oxide, 1,2-epoxypropane, or a halo-substituted 1,2-epoxypropane, and is represented by the formulas

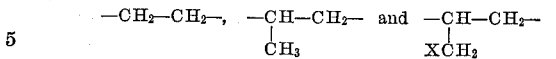

wherein X is a halogen, such as fluorine, chlorine, bromine, or iodine. Also especially useful are compounds of the above formula wherein R is a divalent residue represented by the formulas

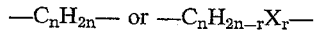

wherein X is a halogen, $n$ is an integer having a value of from 2 to 12, and $r$ is an integer having a value of 1 or 2. The hydroxyalkyl polyphosphates employed in the instant invention can be prepared by the reaction of a vicinal epoxide with a polyphosphoric acid, as described in U.S. Patent 3,099,676.

The coordination complexes of the instant invention are prepared by mixing the metal halide and the hydroxyalkyl polyphosphate compound in a ratio of from about 0.25 mole to about 10 moles, preferably from about 0.5 mole to about 3 moles, of the metal halide per mole equivalent of P=O in the polyphosphate, and mildly heating the mixture if necessary. Temperatures of 50° C. or less are usually adequate, although temperatures of from less than 0° C. to greater than 100° C. can be employed. The metal halide first forms a coordination complex with the polyphosphate, with any metal halide over and above that required to form the complex then dissolving in the complex to produce viscous liquid or low melting solids. In the case of difficultly soluble metal halides, such as the metal iodides, complexing of the metal halide with the polyphosphate may be facilitated by first dissolving the metal halide and the polyphosphate in a suitable inert polar organic solvent and then evaporating the solvent. Suitable solvents include alcohols such as ethanol, butanol, isopropanol, and the like, ethers such as ethyl ether, tetrahydrofuran, and the like, esters such as ethyl acetate, and the like, aromatic hydrocarbons such as benzene, toluene, and the like, and alkyl halides such as ethylene dichloride, and the like. In general, an amount of solvent ranging from about 1 to about 100 times, preferably from about 5 to about 20 times, the weight of the reactants can be effectively employed.

The complexes prepared in accordance with the instant invention are soluble in a wide variety of organic media, including organic liquids, monomers, and polymers. Among the organic liquids in which these complexes are readily soluble are poly(propylene glycol), ethanol, butanol, isopropanol, ethyl ether, tetrahydrofuran, ethyl acetate, benzene, toluene, ethylene dichloride, and the like. These complexes can be dissolved in various polymerizable monomers, such as styrene, methyl methacrylate, vinyl acetate, ethyl acrylate, and the like. When they are dissolved in polymeric systems, they function as flame retardants for such systems. Among the polymeric systems in which the fire retarding complexes of the instant invention can be readily dissolved and blended are epoxy, phenolic, polyurethane, polyester, and polystyrene resins. These complexes can be readily dissolved in such resins by milling on a two-roll mill. Amounts of complex of from about 1 part by weight to about 40 parts by weight, or higher, preferably from about 10 parts by weight to about 25 parts by weight, based on the total weight of the blend, are suitable and more effective than an equal weight of the polyphosphate alone.

Fire retardant resins can also be prepared by dissolving the complexes of the instant invention in a polymerizable monomer, such as styrene, methyl methacrylate, vinyl acetate, ethyl acrylate, and the like, and then polymerizing the monomer. The amounts of complex to be employed are the same as those employed when the complex is directly incorporated in polymeric systems.

When the complexes of the instant invention are prepared from polyphosphates which contain an unsaturated group, they can be incorporated into polymeric structures by interpolymerizing such complexes with other polymerizable monomers. Interpolymerization can be effected by means of a suitable vinyl polymerization catalyst, such as a catalyst capable of forming free radicals under the polymerization conditions employed. Generally, temperatures of from about 0° C. to about 200° C. are suitable. Known solvents can be employed in the polymerization mixture if desired. Among the free radical catalyst which can be employed are oxygen, either alone or together with a trialkyboron, such as trimethylboron, triethylboron and tripropylboron, peroxides such as hydrogen peroxide, diethyl peroxide, dibenzoyl peroxide, distearyl peroxide, di-tertiary-butyl peroxide, tertiary-butyl hydroperoxide, diacetyl peroxide, distearoyl peroxide and acetyl benzoyl peroxide; azo compounds such as $\alpha,\alpha'$-azo-bis-isobutyronitrile and 2,2'-dicyanoazobenzene; percarbonates such as diisopropyl percarbonate and di-tertiary-butyl percarbonate; and peresters such as tertiary-butyl perbenzoate and acetaldehyde monoperacetate. These catalysts are employed in amounts which are conventionally employed in the art, either individually or in various mixtures thereof. Thus such catalysts can be employed in an amount of from about 0.2 percent by weight to about 10 percent by weight, preferably from about 0.5 percent by weight to about 3 percent by weight, of the total amount of monomers present.

The complexes of the instant invention can also be reacted with organic polyisocyanates in the preparation of poly urethane products such as foams, surfacing coatings, adhesives, elastomers, and the like, or with polyepoxide resins in the preparation of castings, laminates, molded articles, and the like.

The following examples are set forth for purposes of illustration so that those skilled in the art may better understand this invention, and it should be understood that they are not to be construed as limiting this invention in any manner.

Example 1

Nine hundred (900) pounds of tetrapolyphosphoric acid at a temperature of 70-75° C. was pumped into 900 pounds of ethyl acetate while maintaining the temperature of the resulting mixture at 25° C. by cooling. Nine hundred and thirty (930) pounds of 1,2-epoxypropane were then added to this temperature while cooling was continued. The temperature was then permitted to rise to 70° C., and an additional 1860 pounds of 1,2-epoxypropane were added.

The reaction mixture was stripped at 100° C. at 2 mm. Hg pressure, to remove ethyl acetate and unreacted 1,2-epoxypropane. The polyphosphate product recovered weighed 2970 pounds, and had a hydroxyl number of 354 and a phosphorus content of 10.54 percent by weight. Infrared analysis showed a phosphoryl band of $8.0\mu$.

Example 2

Eightly (80) grams (0.272 P=O mole equivalents) of the polyphosphate prepared in accordance with Example 1 were added to 37 grams (0.162 mole) of antimony trichloride, and the mixture was heated at 50° C. for five minutes to effect solution.

The liquid product was characterized by an infrared spectrum of $8.09\mu$ for the phosphoryl band and $2.95\mu$ for the hydroxyl band.

When the procedure is repeated for stannic chloride and titanium tetrachoride, similar results are obtained.

Example 3

Eighty (80) grams (0.272 P=O mole equivalents) of the polyphosphate prepared in accordance with Example 1 were added to 20 grams (0.088 mole) of antimony trichloride, and the mixture was heated at 50° C. for five minutes to effect solution.

The liquid product was soluble in poly (propylene glycol). The infrared spectrum of the product showed a broad phosphoryl band of $8.02\mu$ and a hydroxyl band of $2.96\mu$.

Example 4

One hundred and eighty (180) grams (0.612 P=O mole equivalents) of the polyphosphate prepared in accordance with Example 1 were added to 20 grams (0.088 mole) of antimony trichloride, and the mixture was heated at 50° C. for five minutes to effect solution.

The infrered spectrum of the product showed a broad phosphoryl band of $8.02\mu$ and a hydroxyl band of $2.96\mu$.

The product was formulated into a rigid polyurethane foam having reduced flammability properties by curing the formulation described below at 70° C. for 10 minutes. The formulation employed in preparing the foam consisted of:

(a) 90 grams of a 1,2-epoxypropane adduct of sucrose having a hydroxyl number of 563
(b) 33.4 grams of the product prepared as above
(c) 172 grams of a "prepolymer" prepared by reacting 132 grams of tolylene diisocyanate with a mixture of 24 grams of the adduct described in (a) and 16 grams of the polyphosphate of Example 1.
(d) 1.8 grams of a silicone emulsifier
(e) 38.4 grams of monofluorotrichloromethane
(f) 3.6 grams of a 33 percent by weight solution of triethylenediamine in 1,2,6-hexanetriol.

What is claimed is:

1. A coordination complex of a normal halide salt of a metal selected from the group consisting of antimony, tin and titanium, with a hydroxyalkyl polyphosphate represented by the formula

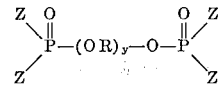

wherein R is a divalent residue of a vicinal epoxide; y is an integer having a value of at least 1; and each Z is individually selected from the group consisting of

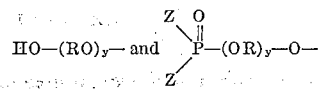

wherein R, y and Z are as above defined; said complex being prepared by admixing the normal metal halide salt and polyphosphate in a ratio of from about 0.25 mole to about 10 moles of the normal metal halide salt per mole equivalent of P=O in the polyphosphate.

2. A coordination complex of a normal halide salt of a metal selected from the group consisting of antimony, tin and titanium, with a hydroxyalkyl polyphosphate represented by the formula

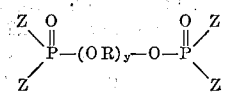

wherein R is a divalent residue of a vicinal epoxide; y is an integer having a value of at least 1; and each Z is individually selected from the group consisting of

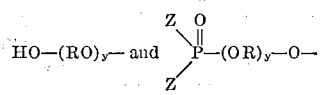

wherein R, y and Z are as above defined; said complex being prepared by admixing the normal metal halide salt and polyphosphate in a ratio of from about 0.5 mole to about 3 moles of the normal metal halide salt per mole equivalent of P=O in the polyphosphate.

3. A complex as in claim 2 wherein the normal metal halide salt is antimony trichloride.

4. A coordination complex of a normal halide salt of a metal selected from the group consisting of antimony, tin and titanium, with a hydroxyalkyl polyphosphate represented by the formula

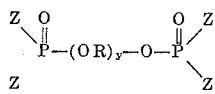

wherein R is a member selected from the group consisting of $$-C_nH_{2n}- \text{ and } -C_nH_{2n-r}X_r-$$

wherein X is a halogen, $n$ is an integer having a value of from 2 to 12, and $r$ is an integer having a value of from 1 to 2; $y$ is an integer having a value of at least 1; and each Z is individually selected from the group consisting of

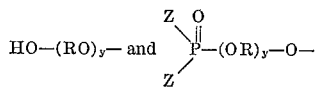

wherein R, $y$ and Z are as above defined; said complex being prepared by admixing the normal metal halide salt and polyphosphate in a ratio of from about 0.25 mole to about 10 moles of the normal metal halide salt per mole equivalent of P=O in the polyphosphate.

5. A coordination complex of a normal halide salt of a metal selected from the group consisting of antimony, tin and titanium, with a hydroxyalkyl polyphosphate represented by the formula

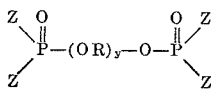

wherein R is a member selected from the group consisting of $$-C_nH_{2n}- \text{ and } -C_nH_{2n-r}X_r-$$

wherein X is a halogen, $n$ is an integer having a value of from 2 to 12, and $r$ is an integer having a value of from 1 to 2; $y$ is an integer having a value of at least 1; and each Z is individually selected from the group consisting of

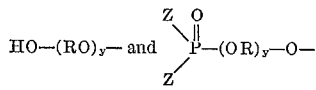

wherein R, $y$ and Z are as above defined; said complex being prepared by admixing the normal metal halide salt and polyphosphate in a ratio of from about 0.5 mole to about 3 moles of the normal metal halide salt per mole equivalent of P=O in the polyphosphate.

6. A complex as in claim 5 wherein normal metal halide salt is antimony trichloride.

7. A coordination complex of a normal halide salt of a metal selected from the group consisting of antimony, tin and titanium, with a hydroxyalkyl polyphosphate represented by the formula

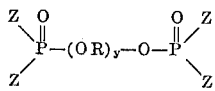

wherein R is

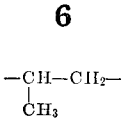

$y$ is an integer having a value of at least 1; and each Z is individually selected from the group consisting of

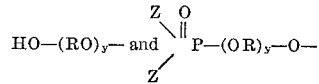

wherein R, $y$ and Z are as above defined; said complex being prepared by admixing the normal metal halide salt and polyphosphate in a ratio of from about 0.25 mole to about 10 moles of the normal metal halide salt per mole equivalent of P=O in the polyphosphate.

8. A coordination complex of a normal halide salt of a metal selected from the group consisting of antimony, tin and titanium, with a hydroxyalkyl polyphosphate represented by the formula

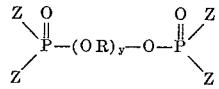

wherein R is

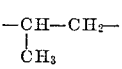

$y$ is an integer having a value of at least 1; and each Z is individually selected from the group consisting of

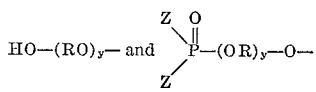

wherein R, $y$ and Z are as above defined; said complex being prepared by admixing the normal metal halide salt and polyphosphate present in a ratio of from about 0.5 mole to about 3 moles of the normal metal halide salt per mole equivalent of P=O in the polyphosphate.

9. A complex as in claim 8 wherein the normal metal halide salt is antimony trichloride.

References Cited

UNITED STATES PATENTS

| | | | |
|---|---|---|---|
| 3,099,676 | 7/1963 | Lanham | 260—461.303 |
| 2,885,417 | 5/1959 | Heyden | 260—429.7 |

OTHER REFERENCES

Van Wazar et al.: "Journal of American Chemical Society" (1950), vol. 72, pp. 660 to 661.

Fleming et al.: "Chemistry and Industry" (1959), p. 1409.

Zackrisson et al.: "Journal of Inorganic Nucl. Chem." (1961), vol. 17, pp. 69 to 76.

Bailar: "Chemistry of the Co-ordination Compounds," ACS Monogram Series, No. 131, 1956, pp. 771–776.

TOBIAS E. LEVOW, *Primary Examiner.*

W. F. W. BELLAMY, *Assistant Examiner.*